US008625881B2

(12) United States Patent
McKnight

(10) Patent No.: US 8,625,881 B2
(45) Date of Patent: Jan. 7, 2014

(54) ENHANCED GHOST COMPENSATION FOR STEREOSCOPIC IMAGERY

(75) Inventor: Douglas J. McKnight, Beverly Hills, CA (US)

(73) Assignee: RealD Inc., Beverly Hills, CA (US)

( * ) Notice: Subject to any disclaimer, the term of this patent is extended or adjusted under 35 U.S.C. 154(b) by 467 days.

(21) Appl. No.: 12/541,892

(22) Filed: Aug. 14, 2009

(65) Prior Publication Data

US 2010/0040280 A1   Feb. 18, 2010

Related U.S. Application Data

(60) Provisional application No. 61/089,468, filed on Aug. 15, 2008.

(51) Int. Cl.
*G06K 9/00* (2006.01)

(52) U.S. Cl.
USPC .......................................................... 382/154

(58) Field of Classification Search
USPC .......................................................... 382/154
See application file for complete search history.

(56) References Cited

U.S. PATENT DOCUMENTS

| 4,986,632 | A | 1/1991 | Eckmann |
| 6,124,977 | A * | 9/2000 | Takahashi ..................... 359/636 |
| 6,532,008 | B1 | 3/2003 | Guralnick |
| 7,734,086 | B2 * | 6/2010 | Lee et al. ..................... 382/154 |
| 7,822,265 | B2 * | 10/2010 | Berretty ....................... 382/154 |
| 2006/0268104 | A1 | 11/2006 | Cowan et al. |
| 2007/0188602 | A1 | 8/2007 | Cowan et al. |
| 2008/0117233 | A1 * | 5/2008 | Mather et al. ................. 345/690 |

OTHER PUBLICATIONS

International Search Report for PCT/US2009/053950 mailed Oct. 14, 2009.

* cited by examiner

*Primary Examiner* — Vikkram Bali
(74) *Attorney, Agent, or Firm* — Neil G. J. Mothew; Darlene K. Kondo

(57) ABSTRACT

A method and apparatus for reduction of ghost images in stereoscopic images. This disclosure provides a ghost compensation apparatus and methods that detect affected regions where ghosting may occur in a stereoscopic image, yet where conventional ghost compensation techniques are ineffective because there is insufficient luminance overhead to conduct a conventional ghost compensation process. Luminance values are modified in such regions prior to applying a ghost compensation process.

34 Claims, 5 Drawing Sheets

ENHANCED GHOST COMPENSATION FOR STEREOSCOPIC IMAGERY

CROSS-REFERENCE TO RELATED APPLICATIONS

This patent application relates and claims priority to provisional patent application 61/089,468, entitled "Enhanced ghostbusting for stereoscopic imagery," filed Aug. 15, 2008, which is herein incorporated by reference for all purposes.

TECHNICAL FIELD

This disclosure relates generally to stereoscopic three-dimensional (3D) imagery and, more specifically, to the reduction of ghosting appearances on stereoscopic images.

BACKGROUND 3D effects are created by presenting different images to the left and right eyes of the viewer such that their visual system generates a sensation of depth. There are a number of different approaches to presenting an independent image to each eye, and many of them share the property that the optical separation of the "right" and "left" channels is not perfect.

This finite channel contrast is a result of various mechanisms, depending on the technique used to achieve separation, but the result is that in many cases, a faint "ghost" image of a bright region intended for the left eye can sometimes be seen by the right eye (and vice versa).

A conventional ghost compensation technique exists, but it only works if there is sufficient brightness available in the image to subtract a ghost image from. For example, if a white, distinct, object is displayed against a black background (such as a full moon in a dark night sky), then a displaced ghost image leaking from one eye's view would be seen against a black background in the other eye. Because the background is black, this ghost image cannot be adequately subtracted using the conventional ghost compensation technique, and so is visible.

The visibility of the artifact has two effects. First, the ghost images are distracting as they can be directly seen. Second, the ghost images are disruptive to the formation of the 3D sensation and so add to viewer fatigue.

BRIEF SUMMARY

The disclosed embodiments hide visible ghost images in deliberately created regions of "disguising" luminance. The disguising luminance allows a ghost compensation ("ghostbusting") process to properly "bury" the ghost.

One benefit of the disguising luminance is that its properties may be chosen such that the disguising luminance is less noticeable than the ghost. Furthermore, the disguising luminance may be added to both the left- and right-eye images in order to assist with the correct fusion of the stereoscopic image. Once the disguising luminance is added, a ghost compensation process is applied, such that the ghost is effectively subtracted from the appropriate left- or right-eye image.

According to an aspect, the disclosure presents a method for processing a stereoscopic image pair (i.e., left and right eye images) having at least one region where a ghost artifact is present. The method includes determining at least one region in the stereoscopic image pair where a ghost compensation process has a low probability of success. When the ghost compensation process has a low probability of success, a ghost compensation overhead is applied to the at least one region, and the ghost compensation process is performed on the at least one region.

According to another aspect, the disclosure presents an apparatus for processing a stereoscopic image pair having a left eye image and a right eye image. The apparatus includes a detection module, an image adjustment module and a ghost compensation module. The detection module is operable to determine at least one region in the stereoscopic image pair where a ghost compensation process has a low probability of success. When the detection module determines a low probability of success, the image adjustment module is operable to adjust the at least one region to provide a ghost compensation overhead to the at least one region. The apparatus also includes a ghost compensation module operable to perform ghost compensation to the at least one region.

Other aspects and features will be apparent with reference to the detailed description, the drawings, and the appended claims.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1A:
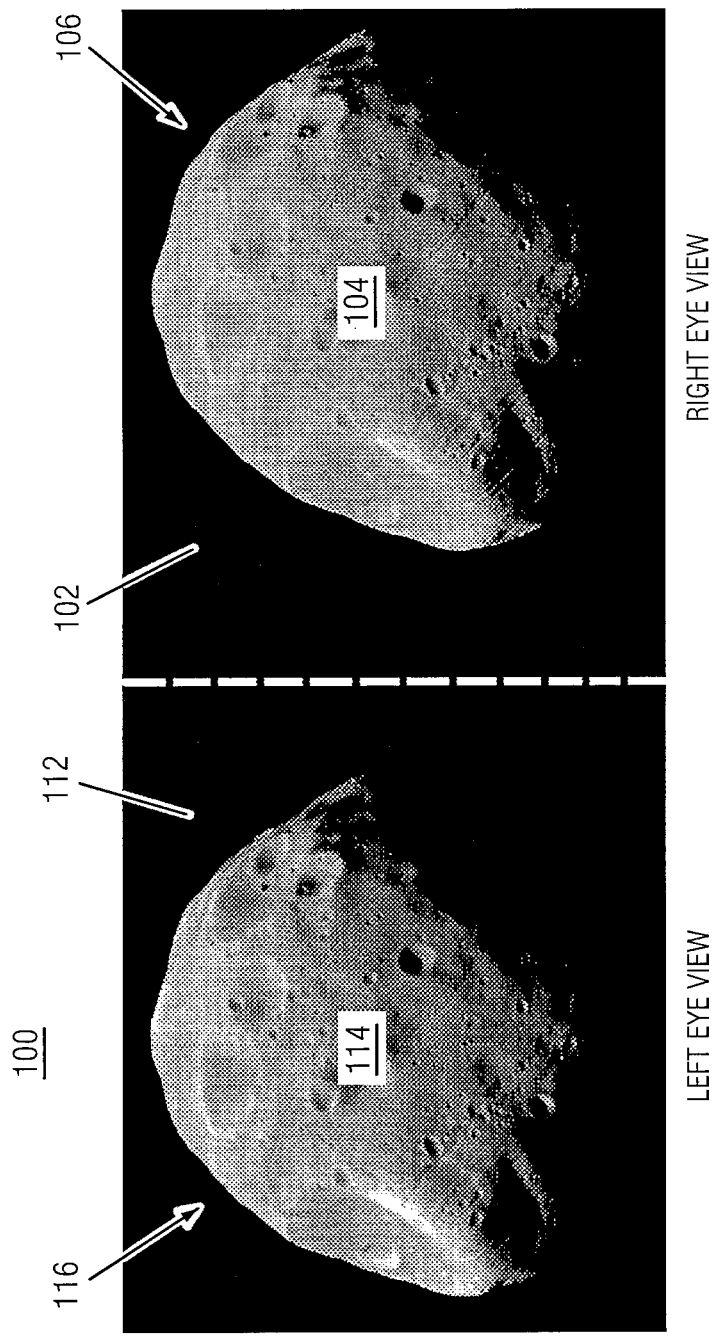
FIG. 1A is a schematic diagram illustrating is an exemplary stereoscopic image pair for which a conventional ghost compensation process is likely to have a low probability of success.

Ghost images are associated with relatively bright regions intended for one eye, that are co-located in viewing space with dark regions intended for the other eye. Therefore, a ghost image tends to increase the brightness of a substantially dark region in the image in which it appears. Ghosting may be caused by the leakage of the left eye image into the right eye and vice versa. The cause of this in a digital system may be the imager and the optical elements of the system through the lens, screen, and glasses. The perceptibility of a ghost image depends on a number of factors, including, but not limited to, channel contrast, disparity (left-right separation of the object), edge visibility, viewer engagement. The visibility of a ghost artifact has two effects. First, the ghost images are distracting as they can be directly seen. Second, the ghost images are disruptive to the formation of the 3D sensation and, thus, add to viewer fatigue.

A conventional ghost compensation process reduces or removes any double images or ghosts of images that can appear when left eye/right eye stereoscopic image pairs are converged. Generally speaking, the conventional ghost compensation process evaluates the left and right images of a stereo pair to create a new pair of ghost-compensated images which are to be output by the display. For example, the original left image is evaluated to determine the amount of ghost that the image would introduce into the right view, based on predictive models. This amount of "ghost" is then used to calculate the adjusted right-eye image, which includes the appropriate "anti-ghost" value. To the right eye, when this adjusted image is displayed, the anti-ghost value cancels out the ghost value contributed during the output of the left-eye image. With this cancellation, the right eye of the viewer sees the originally intended right eye view. The same process may be used to generate the adjusted left-eye image in order to present the originally intended left eye view.

A conventional ghost compensation process operates by recognizing that there exists a-priori knowledge of the existence and position of the ghost images, so they may be suppressed by pre-subtracting the ghost from the image in which the ghost is anticipated to appear. The a-priori knowledge may include the specific luminance value of the ghost, its location, light leakage amounts, and other relevant information. Specifically, before the left- and right-eye images are combined, the right-eye image is processed by subtracting from it, the anticipated ghost image that will result from adding the left-eye image to the viewing field. Additionally, the left-eye image is processed by subtracting from it the anticipated ghost image that will result from adding the right-eye image to the viewing field.

Each pixel in an image has a finite brightness or luminance value, ranging from 0 to N, corresponding to a level of brightness ranging from no brightness (black, 0) to full brightness (white, N). Because visible ghost images tend to be substantially brighter than the background on which they appear, and there exists a-priori knowledge of the location and brightness of the ghost image, each pixel of the original image corresponding to the anticipated ghost image is darkened by subtracting from it's luminance value the difference in luminance value between the ghost image and the original image. The subtracting of the ghost image from the original image (or rather, the ghost image luminance from the original image luminance) occurs before the images are combined in the viewing field, thus the ghost is said to be "pre-subtracted" from the original image.

A problem with conventional ghost compensation processes is that they may attempt to pre-subtract anticipated ghost images by effectively subtracting from a pixel the increase in luminance anticipated from a resulting ghost image, temporarily leaving the pixel dark enough that when the left- and right-eye images are combined, added luminance from the ghost image will raise the luminance of the darkened pixel back to its original value. Accordingly, this conventional ghost compensation technique may not be effective if the original luminance value of a pixel anticipated to contain a ghost is negligible, and therefore is not bright enough to sufficiently dim the image. For example, one problem with the above-described conventional ghost compensation technique is that it tends to work only if there is sufficient brightness available in the image from which to pre-subtract a ghost image. For example, if a white, distinct, object is displayed against a black background (such as a full moon in a dark night sky), then a displaced ghost image leaking from one eye's view would be seen against the black background in the other eye.

FIG. 1A is an image 100 illustrating an exemplary stereoscopic image pair 106, 116 for which the conventional ghost compensation process may be ineffective. FIG. 100 includes a side-by-side frame, having a stereo pair with a left-eye view 114 and a right eye view 104. Because the background 102, 112 is black, and the luminance value of a black pixel is zero, a ghost image cannot be pre-subtracted from the original images 104, 114 in the black regions 102, 112. Therefore, the ghost image would be visible when the images are combined in the viewing field.

In accordance with the present disclosure, to address such shortcomings of the conventional ghost compensation technique, the luminance values of affected regions may be temporarily increased so that when the ghost images are subtracted, the affected regions contain smoothly, spatially-varying patches of luminance, or "halos", rather than the more obvious ghosting. Accordingly, for regions with negligible luminance, where conventional ghost compensation fails, luminance of image data may be enhanced prior to applying a conventional ghost compensation technique, even in regions with negligible luminance.

Figure 1B:
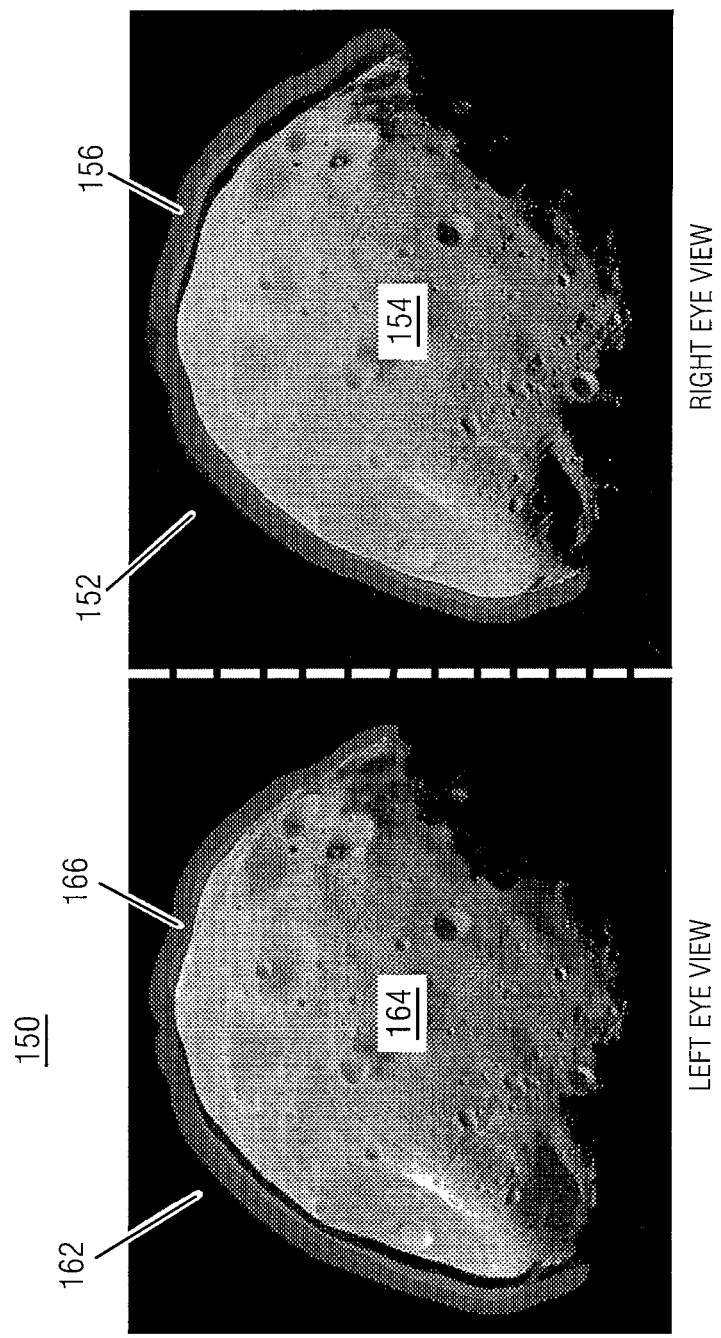
FIG. 1B is a schematic diagram illustrating an exemplary adjusted stereoscopic image pair, in accordance with the present disclosure.

FIG. 1B is a schematic diagram illustrating an exemplary adjusted stereoscopic image pair 150. Similar to FIG. 1A, the background 152, 162 of the image pair 150 is substantially black, with minimal luminance. By applying the enhanced ghost compensation technique of the present disclosure for image pairs 150, smooth spatially-varying patches of luminance, or "halos" 156, 166, are added around the edges of the moons 154, 164 in each of the right and left eye images respectively. The halos 156, 166, themselves, are difficult for a viewer to see and are much less identifiable, or eye-catching, than a typical ghost image with a well-defined edge. In particular, a region of disguising luminance adjacent to an edge will tend to be suppressed by the visual system, which perceives and emphasizes a sharp edge rather than the smoothly, spatially-varying patch of disguising luminance. In addition, a region of disguising luminance allows for some headroom for ghost compensation processes to be applied—i.e. raises the luminance values for certain pixels so that luminance may be pre-subtracted with ghost compensation processes.

Figure 2:
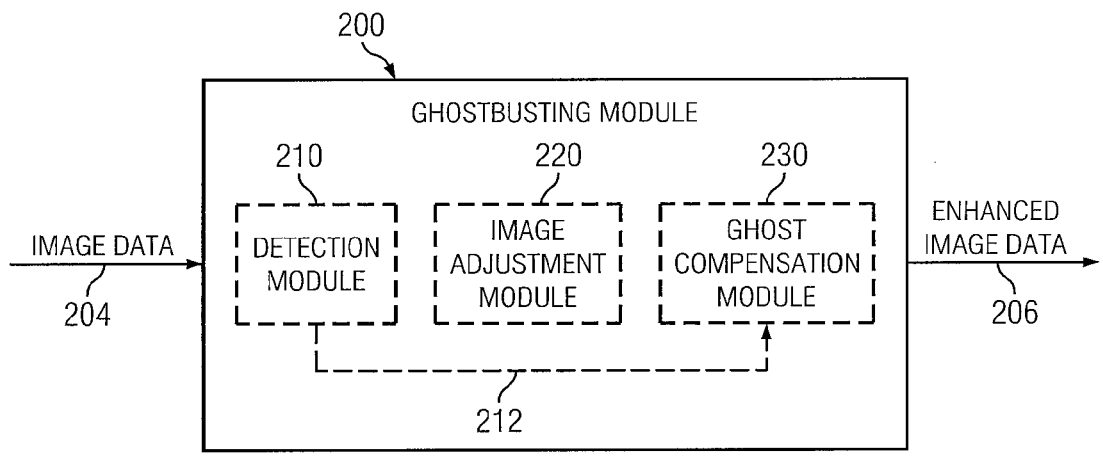
FIG. 2 is a schematic diagram of exemplary ghost compensation apparatus, in accordance with the present disclosure.

FIG. 2 is a schematic diagram illustrating an exemplary embodiment of a ghostbusting module 200. Generally, ghostbusting module 200 provides an apparatus for processing a stereoscopic image pair. Ghostbusting module 200 may include a detection module 210, an image adjustment module 220, and a ghost compensation module 230.

Detection module 210 receives image data input at 204 and is operable to determine at least one region in the stereoscopic image pair where a ghost compensation process has a low probability of success (i.e., whether there is sufficient luminance surrounding key objects in the image(s)). Optionally, the data input at 204 may pass through a first in, first out buffer (not shown) to regulate the flow of input image data.

When the detection module determines a low probability of success, image adjustment module 220 is operable to adjust the at least one region to provide a ghost compensation overhead to the at least one region. Providing the ghost compensation overhead may add some luminance headroom surrounding the key objects.

Ghost compensation module 230 is operable to perform ghost compensation to the at least one region. Performing ghost compensation, the left eye image may be evaluated to determine a ghost amount that can be present in the right eye image; and the right eye image may be modified to compensate for the ghost amount that can be present in the right eye image. In a similar fashion, the right eye image may be evaluated to determine a ghost amount that can be present in the left eye image; and the left eye image may be modified to compensate for the ghost amount that can be present in the left eye image.

Optionally, when the detection module 210 determines a high probability of success, the ghost compensation process may be performed without applying a ghost compensation overhead to the at least one region. Accordingly, ghostbusting module 200 may include a path 212 from detection module to ghost compensation module 230 to send image pairs directly without being modified by the image adjustment module 220.

The resulting enhanced image data is then output via output line 206.

In another embodiment, prior to performing the steps above, the ghostbusting module 200 is also operable to determine whether ghostbusting should be used for a set of image data input at 204. If the image data input at 204 does not need ghost compensation, then the ghostbusting module 200 may simply output, at 206, the same image data input at 204.

In an embodiment, the maximum ghost luminance for a particular system is determined and luminance is artificially added to substantially all dark areas to allow a ghost compensation process to be used. However, this approach may reduce the final contrast of the display system. Nonetheless, an approach like this does have the advantage of being simple to implement and could be useful in certain applications. The dark level is increased by means of adjusting the image data so that a ghost compensation process has non-zero data available to work with.

The ghostbusting module 200 may comprise software, hardware, or a combination of both software and hardware. For example, the ghostbusting module 200 may be embodied in a memory for storing data for access by an application program being executed on a data processing system. In such an embodiment, the application program is operable to process a stereoscopic image pair having a left eye image and a right eye image. Such an embodiment may include a data structure stored in the memory, that includes a detection module data structure, an image adjustment module data structure, and a ghost compensation module data structure. The detection module data structure may be operable to determine at least one region in the stereoscopic image pair where a ghost compensation process has a low probability of success. The image adjustment module data structure may be operable, when the detection module determines a low probability of success, to adjust the at least one region to provide a ghost compensation overhead to the at least one region. The ghost compensation module data structure may be operable to perform ghost compensation to the at least one region.

Figure 3:
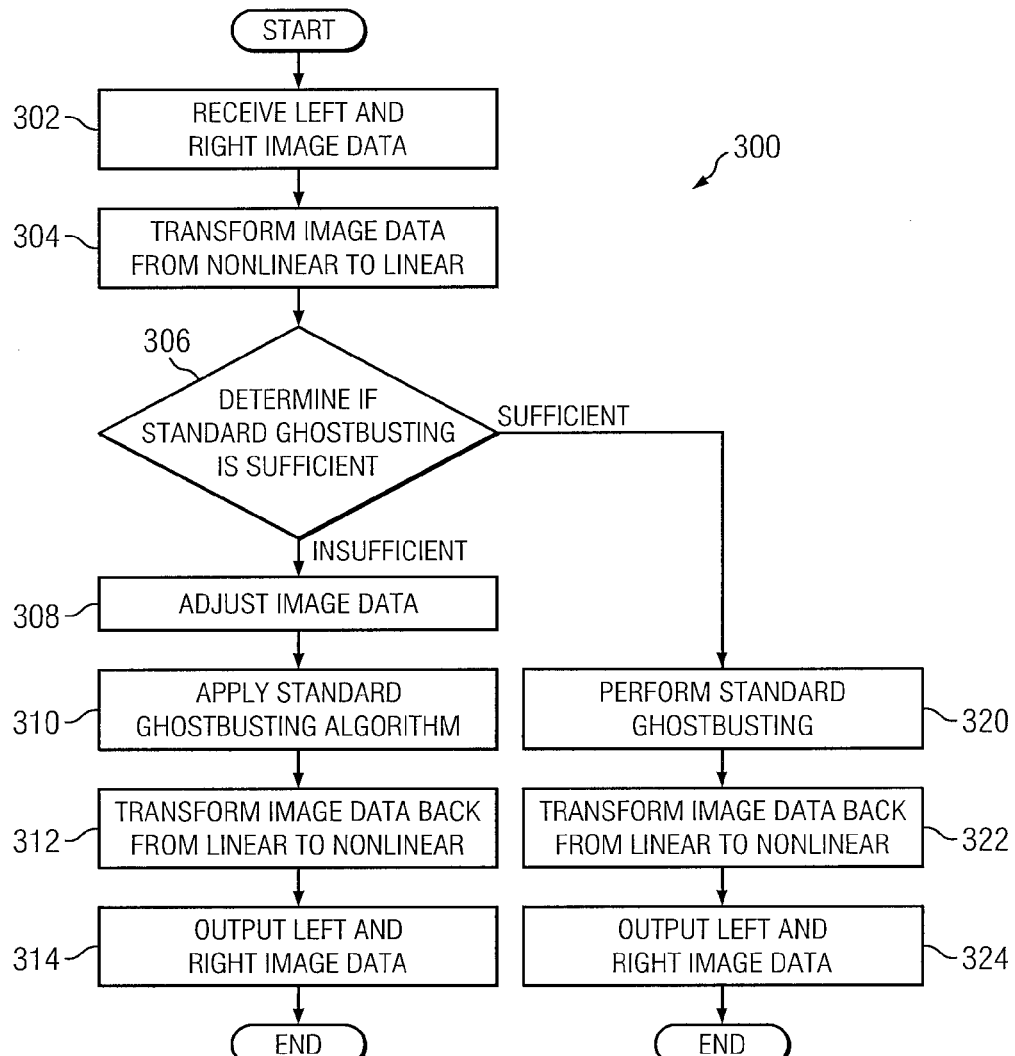
FIG. 3 is a flow chart illustrating an exemplary embodiment of a ghost compensation process, in accordance with the present disclosure.

FIG. 3 illustrates a flow chart 300 illustrating the implementation of an exemplary embodiment of a ghost compensation technique. In operation, the ghost compensation technique commences at step 301. The technique includes receiving the left and right input image data (step 302). Once the input image data is received, it may be transformed into linear luminance data (step 304). Because data in electronic systems is typically stored and transmitted using a nonlinear representation of the light levels, the data may be converted into a linear representation. When linearly representing the luminance of an image (step 304), each pixel in the image may be represented as a finite luminance value ranging from 0 to N. As previously stated, the luminance value of the pixel may correspond to a level of brightness ranging from no brightness (black, 0) to full brightness (white, N).

In an embodiment, implementation of nonlinear coding is defined in the international Rec. 709 standard for HDTV, wherein mapping linear light (as captured from a scene) is encoded using the following relationship:

$$V'_{709}=4.5*L \text{ where } 0 \leq L \leq 0.018$$

$$V'_{709}=1.099*L^{0.45}-0.099 \text{ where } 0.018 \leq L \leq 1$$

Where $V'_{709}$ is the electronic signal describing the linear light, L, and is typically in digital form. Input image data received in this format may be transformed into a linear light representation by inverting the above relationship as follows:

$$L=(V'_{709})/4.5 \text{ where } 0 \leq V'_{709} \leq 0.081$$

$$L=((V'_{709}+0.099)/1.099)^{\wedge}(1/4.5) \text{ where } 0 \leq V'_{709} \leq 1$$

Because the underlying "ghosting" is a result of leakages that are proportional to the light levels in the images, the linear representation of the image data may also be used for subsequent processing.

The technique also includes determining whether conventional ghost compensation is sufficient at step 306. Regions may be found in either image where conventional ghost compensation techniques will not be able to suppress the ghost created when light is leaked from the other image and, thus, a conventional ghost compensation technique is insufficient. If no such regions are found, then the conventional ghost compensation (step 320) technique is sufficient, and the next step includes transforming the data back to a nonlinear format (step 322). After implementing the conventional ghost compensation process, the enhanced left and right output image data is output (step 324). However, when regions are found in either image where conventional ghost compensation is unable to suppress the potential ghost created when light is leaked from the other image, then the conventional ghost compensation technique is determined to be insufficient, and the next step includes adjusting the image data (step 308).

Figure 4:
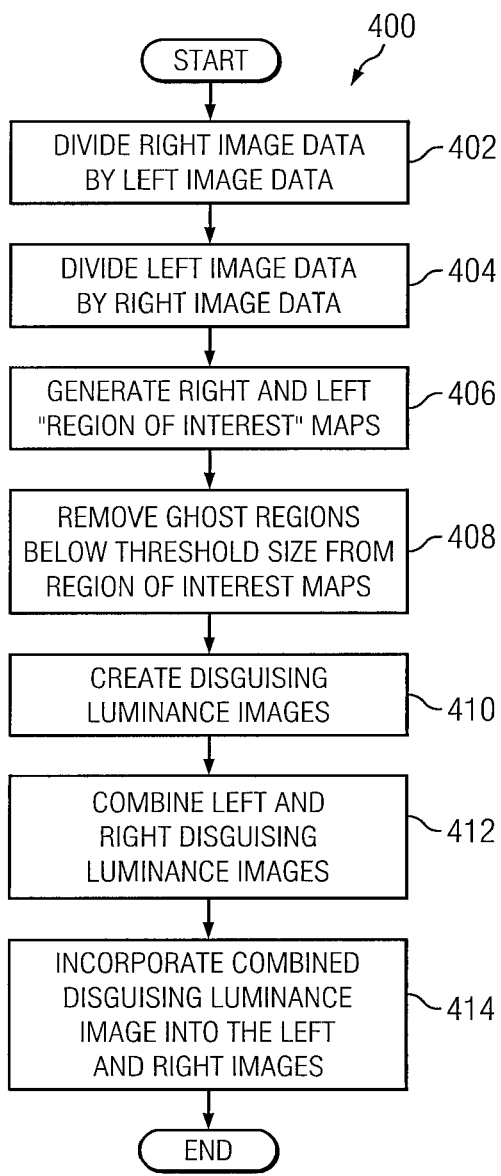
FIG. 4 is a flow chart illustrating an exemplary embodiment of adjusting image data, in accordance with the present disclosure.

FIG. 4 illustrates a flowchart further describing the exemplary Adjust Image Data (step 308) process of FIG. 3.

The Adjust Image Data process (step 308) may begin by dividing the luminance value of the left image pixels by the luminance value of the corresponding pixels in the right image (step 402), and by dividing the luminance value of the right image pixels by the luminance value of the corresponding pixels in the left image (step 404) (or vice versa).

The locations of ghost compensation deficiencies may be plotted in a Region Of Interest (ROI) map (step 406). The ROI map contains a grid of pixels, each pixel of the map corresponding to the location of a pixel in either the right- or left-eye image. The pixels in the ROI map are given a value, either zero or the original image pixel luminance value, wherein the map pixel values are determined on a pixel-by-pixel basis. A threshold may then be applied to the quotient of each pixel-by-pixel comparison to determine if the discrepancy in luminance between the two pixels is enough to sufficiently perform conventional ghost compensation. If the quotient is less than or equal to the threshold value, then the original luminance value of the pixel may be assigned to the corresponding pixel in the ROI map. If the quotient exceeds the threshold value, then the luminance value for the pixel in the map may be set to zero.

In an embodiment, the threshold value may correspond to the channel contrast of the imaging device, and thus, varies depending on the settings of the imaging device. For example, if the channel contrast of the imaging device is 50:1, then the threshold value is 2% because 1/50=0.02. Additionally, if the contrast is 80:1, then the threshold would be 1.25% because 1/80=0.0125. Accordingly, with a contrast ratio of 50:1, at any pixel where the left luminance value is less than 2% of the right luminance value, it can be determined that conventional ghost compensation may not be sufficient to suppress a ghost in the left image (this "residual ghost" information is stored for later use). Thus, the luminance values of the locations (pixels) in which conventional ghost compensation may not be sufficient are assigned to corresponding pixels in the ROI map. The remaining pixels in the ROI map should have a luminance value of zero. In the above example, the left image is being compared to the right image, therefore the left image data is stored in a left ROI map. When the right image is being compared to the left image, the right image data is stored in a right ROI map.

In some circumstances, ghosting may appear in particular color "planes" of a pixel. In some embodiments, these color planes are considered in the calculation and included in the ROI map. For example, a pixel where a ghost could show up in green and red, but not blue, the pixel should be included in the list of problem locations. As previously stated, the problem locations are the pixels in which using conventional ghost compensation alone is determined to be deficient, and are illustrated in a ROI map 406. Color can be characterized by representing the value of each pixel by three numbers corresponding to red, green and blue. Each color in the image may be treated independently by dividing the specific color plane (e.g., red color plane) of one image (e.g., left-eye image) by the same color plane of the other image (e.g., right-eye image), similar to the method of locating ghost compensation deficiencies in the original image as stated above.

Furthermore, the 3-D display system may have different leakages for different colors, and so different thresholds corresponding to the leakage amounts may be chosen for the different color planes to identify the regions where conventional ghost compensation fails. Again, these leakage amounts are already known as they are part of the a-priori information. For example, if the leakage, or crosstalk, in green is 1% and the leakage in blue is 2%, then thresholds of approximately 1% and 2% may be chosen for green and blue, respectively. At the same time, red may also have a different value. As previously stated, if the quotient (when dividing the color planes) is less than or equal to the threshold value for that particular color plane, then the original luminance value of the color plane of the pixel may be assigned to its corresponding pixel color plane in the ROI map. If the quotient exceeds the threshold value, then the luminance value of the color plane of the corresponding pixel in the map may be set to zero.

If the left and right ROI maps generated do not contain any luminance values other than zero, then conventional ghost compensation may be determined to be sufficient, and there may be no further adjustment of the image data, other than transforming it back to a nonlinear format. However, if the left and right ROI maps contain any luminance values corresponding to problem locations (i.e., locations in which conventional ghost compensation is not sufficient), then the image data may be adjusted before conventional ghost compensation methods are applied.

The image adjustment process also involves determining which of these stored problem locations will be selected for further processing. Generally, it is preferred to alter the images as little as possible, so the best solution may be to reject regions of ghosting that are smaller than a certain threshold size (step 408). Such regions could be noise. In an embodiment, standard image processing techniques such as erosion followed by dilation with a circular structuring element of about 15 pixels diameter are used. In another embodiment, residual ghost regions that are less than a certain magnitude are rejected (although conventional ghost compensation may not be ideal in this location, it may be working well enough). In another embodiment, for moving images, it may be preferable to reject regions that do not persist in time. For example, there may be an insignificant region of ghosting that appears in only one frame of a video sequence. Because the frames are displayed at a rate greater than 40 Hz, the human eye may not detect this instance of ghosting, so it may be rejected.

The next step in the process is to create the disguising luminance pattern for each image (step 410). There are many ways to do this, which will achieve similar results. In some embodiments, it may be preferable to generate a blurred version of the ghost image produced in the ROI map, or the modified residual ghost image of the previous step. This may be done using standard techniques such as convolution with a uniform circular kernel of a size similar to the features in the residual ghost image. The kernel should be chosen to maintain the luminance levels of the affected pixels in the image so that the resulting blurred residual ghost image contains enough luminance for the ghost compensation process to operate completely. In an embodiment, the kernel is sufficiently spatially extended so that the edges of the residual ghost are blurred. For example, on 1920 by 1080 pixel images, a convolution kernel with a diameter of 160 pixels may be sufficient.

Once the disguising luminance is created, the blurred residual ghost images of the left- and right-input image data may be combined into a single composite image (step 412). There are several ways to accomplish this. For example, in some embodiments, the left and right blurred residual ghost images may be combined to form a single image which is the pixel-by-pixel-by-color "max" function of these two images. This reduces stereo conflict, by adding luminance for both eyes. The "max" function is defined in the following way:

If $C=\max(A,B)$, then $C=A$ if $A \geq B$, and $C=B$ if $B>A$ wherein C represents the luminance of the single composite image, A represents the luminance of the blurred residual ghost image of the left eye, and B represents the luminance of the blurred residual ghost image of the right eye. At the cost of added complexity, the blurring luminance may be added differently to both images to further reduce stereo conflict.

The left- and right-input image data may be combined with the composite image (step 414) by performing a max function. This will place disguising luminance in the dark regions of the image data, but will not alter other areas. In some embodiments, the blurring luminance of the left and right blurred residual ghost images may be added to the composite image.

Figure 5:
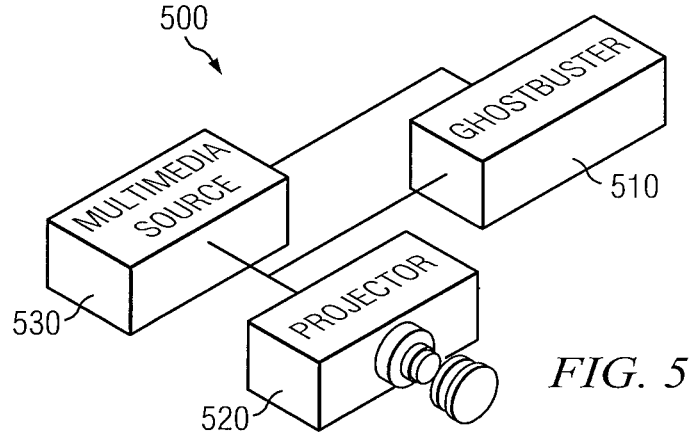
FIG. 5 is an exemplary display setup utilizing the ghost compensation apparatus in a real-time environment, in accordance with the present disclosure.

Referring back to FIG. 3, once the image data is adjusted, the next step is to implement the conventional ghost compensation process (step 310). Because the image data has been adjusted, there should now be enough luminance available for the conventional ghost compensation to work well even in dark regions. The conventional ghost compensation process may be implemented either during the production of the content as part of the software flow (e.g., during movie production), or it may be done at the point of display by some dedicated hardware, software, or combination thereof (e.g., in a movie theater), as illustrated in FIG. 5 (discussed below). After the conventional ghost compensation process is implemented, the image data is transformed back from linear to nonlinear data (step 312).

Referring now back to FIG. 1B, in an embodiment, because the blurring techniques used to create the disguising luminance may cause the disguising luminance to cover a region slightly larger than the ghost in the image, a faint, smoothly, spatially-varying patches of disguising luminance 156, 166 may remain in the image after the ghost compensation process has been implemented, and the ghost is removed. This smoothly, spatially-varying patch of disguising luminance, or "halo" 156, 166, is designed to be less noticeable to the viewer than the ghost image itself.

There are many different detailed process implementations in accordance with the present disclosure, and there are many parameters available for "tuning" these processes. The details of the implementation design may be chosen depending on a number of factors including the hardware available, whether the process operates in "real-time" or "off-line", and the quality of result desired. Furthermore, the details of the implementation could use standard techniques to increase the speed of processing over a simple implementation of the process described above.

Referring now back to FIG. 3, after implementing the conventional ghost compensation process, the final step is to reformat and output the enhanced left and right output image data (step 314). Again, because data in electronic systems is stored and transmitted using a nonlinear representation of the light levels, the output data should be converted back into its nonlinear representation (step 312) for transmission.

Using the same light relationship as above, the output image data is encoded using the following relationship:

$$V'_{709} = 4.5*L \text{ where } 0 \leq L \leq 0.018$$

$$V'_{709} = 1099*L^{0.45} - 0.099 \text{ where } 0.018 \leq L \leq 1$$

where $V'_{709}$ is the electronic signal describing the linear light, L, and is typically in digital form.

FIG. 5 is a schematic diagram illustrating a projection system 500 with an enhanced ghost compensation module 510 operating at "the point of display" by some dedicated hardware, software, or combination thereof. The ghost compensation module 510 receives at least some image data from a multimedia source 530 and provides enhanced image data to the projector 520.

Figure 6A:
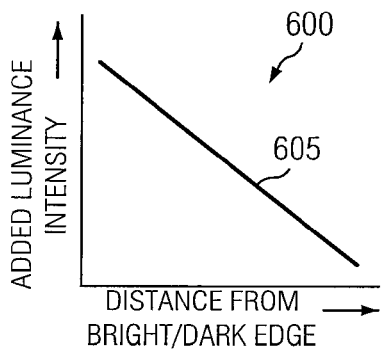
FIGS. 6A-6D are graphs showing exemplary added luminance intensity profiles as a function of distance from a bright object bright/dark edge, in accordance with the present disclosure.

FIGS. 6A-6D are graphs 600, 610, 620, and 630 showing exemplary added luminance intensity profiles as a function of distance from a bright object bright/dark edge (i.e., spatially-varying luminance). Such added luminance provides the ghost compensation overhead. For instance graph 600 shown in FIG. 6A shows a relationship of added luminance intensity decreasing linearly 605 with distance from a bright/dark edge. An example of a bright/dark edge may be the interface between the moon 164 and the dark region 162 of FIG. 1B.

Figure 6B:
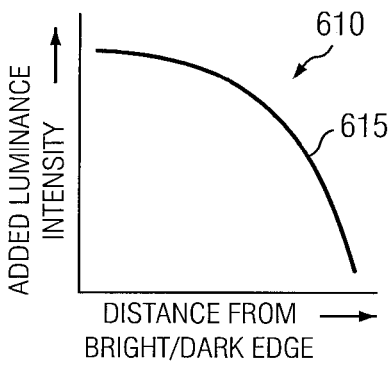
Figure 6C:
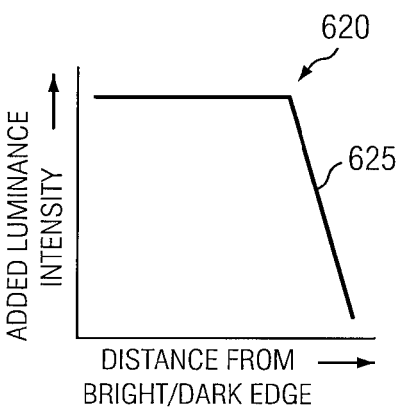
Figure 6D:
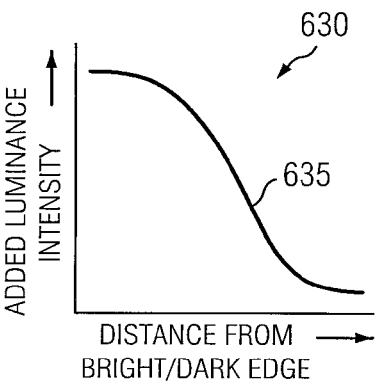

Line 615 of FIG. 6B illustrates a more gradual tapering-off of added luminance from the bright/dark edge. Line 625 of FIG. 6C shows a level of added luminance decreasing more suddenly at a distance from the bright/dark edge. Line 635 of FIG. 6D shows more of a half-bell curve intensity profile. It should be apparent from the many exemplary (and non-limiting) examples that various intensity profiles may be used to provide the ghost compensation overhead. Additionally, luminance may be added in one or more color component. Also, the increase in luminance may provide a substantially inconspicuous increase in luminance.

FIGS. 6A-6D are graphs showing exemplary added luminance intensity profiles as a function of distance from a bright object bright/dark edge (i.e., spatially-varying luminance). Such added luminance provides the ghost compensation overhead. For instance graph 600 shown in FIG. 6A shows a relationship of added luminance intensity decreasing linearly with distance from a bright/dark edge. An example of a bright/dark edge may be the interface between the moon 164 and the dark region 162 of FIG. 1B.

Line 615 of FIG. 6B illustrates a more gradual tapering-off of added luminance from the bright/dark edge. Line 625 of FIG. 6C shows a level of added luminance decreasing more suddenly at a distance from the bright/dark edge. Line 635 of FIG. 6D shows more of a half-bell curve intensity profile. It should be apparent from the many exemplary (and non-limiting) examples that various intensity profiles may be used to provide the ghost compensation overhead. Additionally, luminance may be added in one or more color component. Also, the increase in luminance may provide a substantially inconspicuous increase in luminance.

What is claimed is:

1. A method for processing a stereoscopic image pair having a left eye image and a right eye image, the method comprising:
   determining at least one region in a ghost artifact of the stereoscopic image pair where a ghost compensation process has a low probability of success; and
   when the ghost compensation process has a low probability of success:
      applying a ghost compensation overhead primarily to the at least one region in the ghost artifact, and
      performing the ghost compensation process on the at least one region.

2. The method of claim 1, wherein applying the ghost compensation overhead comprises modifying luminance values in the at least one region.

3. The method of claim 2, wherein modifying luminance values comprises increasing the luminance.

4. The method of claim 3, wherein the increase in luminance provides a substantially inconspicuous increase in luminance.

5. The method of claim 4, wherein the substantially inconspicuous increase in luminance comprises a spatially-varying patch of luminance.

6. The method of claim 5, wherein the spatially-varying patch of luminance decreases in luminance relative to distance from a bright/dark object edge.

7. The method of claim 1, wherein applying the ghost compensation overhead comprises increasing brightness in the at least one region.

8. The method of claim 1, wherein applying the ghost compensation overhead comprises modifying luminance of at least one color component in the at least one region.

9. The method of claim 1, wherein the ghost compensation process has a low probability of success when there is insufficient luminance in the left eye image or right eye image to perform the ghost compensation process on the at least one region.

10. The method of claim 1, wherein the ghost compensation process has a low probability of success when a region of negligible luminance proximate to a region of significant luminance is determined.

11. The method of claim 1, further comprising:
    when the ghost compensation process has a high probability of success:
       performing the ghost compensation process without applying a ghost compensation overhead to the at least one region.

12. The method of claim 11, wherein the ghost compensation process has a high probability of success when there is sufficient luminance in the left eye image or right eye image to perform the ghost compensation process on the at least one region.

13. The method of claim 1, wherein the ghost compensation process comprises:

evaluating the left eye image to determine a ghost amount that can be present in the right eye image; and modifying the right eye image to compensate for the ghost amount that can be present in the right eye image.

14. The method of claim 1, wherein the ghost compensation process comprises:

evaluating the right eye image to determine a ghost amount that can be present in the left eye image; and modifying the left eye image to compensate for the ghost amount that can be present in the left eye image.

15. The method of claim 1, further comprising buffering an incoming stream of a plurality of stereoscopic image pairs.

16. The method of claim 1, further comprising projecting the ghost-compensated image pair in a polarization-encoded stereoscopic cinema environment.

17. The method of claim 1, further comprising determining the magnitude of the ghost artifact.

18. The method of claim 17, further comprising:

when the magnitude of the potential ghost artifact exceeds a predetermined threshold, applying the ghost compensation process.

19. The method of claim 1, wherein the determining at least one region in the image pair where a conventional ghost compensation process has a low probability of success further comprises:

determining whether there is sufficient luminance overhead in the at least one region.

20. The method of claim 1, further comprising:

prior to determining at least one region in the stereoscopic image pair where the ghost compensation process has a low probability of success, converting the stereoscopic image pair from a nonlinear representation to a linear representation.

21. The method of claim 1, further comprising:

after performing the ghost compensation process, converting the stereoscopic image pair from a linear representation to a nonlinear representation.

22. Apparatus for processing a stereoscopic image pair having a left eye image and a right eye image, the apparatus comprising:

a detection module configurable to determine at least one region in a ghost artifact of the stereoscopic image pair where a ghost compensation process has a low probability of success;

an image adjustment module-configurable, when the detection module determines a low probability of success, to adjust the at least one region to provide a ghost compensation overhead primarily to the at least one region in the ghost artifact; and a ghost compensation module configurable to perform ghost compensation to the at least one region.

23. The apparatus of claim 22, wherein providing the ghost compensation overhead comprises modifying luminance values in the at least one region.

24. The apparatus of claim 23, wherein modifying luminance values comprises increasing the luminance of at least one color component in the at least one region.

25. The apparatus of claim 22, wherein the detection module is configurable to determine a low probability of success when there is insufficient luminance in the left eye image or right eye image to perform the ghost compensation process on the at least one region.

26. The apparatus of claim 22, further comprising a path from the detection module to the ghost compensation module, wherein when the detection module determines a high probability of success, the stereoscopic image pair is transmitted on the path from the detection module to the ghost compensation module.

27. The apparatus of claim 22, wherein the ghost compensation process has a high probability of success when there is sufficient luminance in the left eye image or right eye image to perform the ghost compensation process on the at least one region.

28. The apparatus of claim 22, wherein the ghost compensation module is configurable to:

evaluate the left eye image to determine a ghost amount that can be present in the right eye image; and modify the right eye image to compensate for the ghost amount that can be present in the right eye image.

29. The apparatus of claim 22, wherein the ghost compensation module is configurable to:

evaluate the right eye image to determine a ghost amount that can be present in the left eye image; and modify the left eye image to compensate for the ghost amount that can be present in the left eye image.

30. The apparatus of claim 22, further comprising a buffer module configurable to buffer an incoming stream of a plurality of stereoscopic image pairs.

31. The apparatus of claim 22, wherein the apparatus is located in a polarization-encoded stereoscopic cinema environment.

32. The apparatus of claim 22, further comprising a nonlinear to linear conversion module configurable to convert the stereoscopic image pair from a nonlinear representation to a linear representation.

33. The apparatus of claim 22, further comprising a linear to nonlinear conversion module configurable to convert a ghost-compensated stereoscopic image pair from a linear representation to a nonlinear representation.

34. A memory for storing data for access by an application program being executed on a data processing system, the application program being operable to process a stereoscopic image pair having a left eye image and a right eye image, comprising:

a data structure stored in the memory, the data structure including:

a detection module data structure operable to determine at least one region in a ghost artifact of the stereoscopic image pair where a ghost compensation process has a low probability of success;

an image adjustment module data structure operable, when the detection module determines a low probability of success, to adjust the at least one region to provide a ghost compensation overhead primarily to the at least one region in the ghost artifact; and a ghost compensation module data structure operable to perform ghost compensation to the at least one region.

* * * * *